(12) United States Patent
Tanimoto

(10) Patent No.: US 7,069,503 B2
(45) Date of Patent: Jun. 27, 2006

(54) DEVICE AND PROGRAM FOR STRUCTURED DOCUMENT GENERATION DATA STRUCTURE OF STRUCTURAL DOCUMENT

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 571 days.

(21) Appl. No.: 10/160,978

(22) Filed: May 30, 2002

(65) Prior Publication Data
US 2003/0005045 A1 Jan. 2, 2003

(30) Foreign Application Priority Data

| Jun. 4, 2001 | (JP) | ............................. 2001-168190 |
| Jun. 4, 2001 | (JP) | ............................. 2001-168191 |
| Jun. 4, 2001 | (JP) | ............................. 2001-168192 |

(51) Int. Cl.
*G06F 17/18* (2006.01)
(52) U.S. Cl. ....................................... 715/513; 707/102
(58) Field of Classification Search ................ 715/513, 715/523, 530, 531, 760; 707/102
See application file for complete search history.

(56) References Cited

U.S. PATENT DOCUMENTS

| 6,014,680 A | * | 1/2000 | Sato et al. .................. 715/513 |
| 6,438,217 B1 | * | 8/2002 | Huna ....................... 379/88.14 |
| 6,490,603 B1 | * | 12/2002 | Keenan et al. ............... 715/513 |
| 6,922,697 B1 | * | 7/2005 | Suehira ...................... 707/102 |

FOREIGN PATENT DOCUMENTS

| JP | 09-083715 | 3/1997 |
| JP | 10-107833 | 4/1998 |
| JP | 10-155001 | 6/1998 |
| JP | 11-167534 | 6/1999 |
| JP | 2000-196798 | 7/2000 |
| JP | 2001-084185 | 3/2001 |

* cited by examiner

*Primary Examiner*—Sanjiv Shah
(74) *Attorney, Agent, or Firm*—Hogan & Hartson LLP

(57) ABSTRACT

Within a facsimile communication, a moving image communication and a voice data communication, a structured document generation device transforms a main data of communication/non-character data into text data/character data. The structured document generation device also transforms and extracted data from the communication's information into an attribute which is attached to a facsimile data, a moving image data or a voice data, so as to make a document with a structured data with the character data and attribute mentioned above. The communication's information includes an ID of a source address, an ID of a receiving device, a communication time and date, a data type, a data volume and a transmitted information based on a communication protocol. The communication's information is attached to an attribute of the non-character data, which makes it possible to control and process the non-character data as it is the structured document.

10 Claims, 8 Drawing Sheets

```xml
<?xml version="1.0" encoding="iso-8859-1"?>
<svg xml:space="preserve" width="400" height="400">
```
```
<desc>This is an example data </desc>
<title>Received Facsimile Document No.0123456</title>
<sampleattribute>
<ProcessInfo>
   </ Comtypeinfo>facsimile BFT communication</ Comtypeinfo>
   </ MachineInfo>192.168.1.1</ MachineInfo>
</ ProcessInfo>
<ComInfo>
   <DateInfo>July 5 2000</ DateInfo>
   <ResultInfo>#OK</ ResultInfo>
   <PagesInfo>1</ PagesInfo>
   <TimeInfo>10(min)</ TimeInfo>
   <CSIInfo>123456789</ CSIInfo>
   <TSIInfo>987654321</ TSIInfo>
</ ComInfo>
<OriginalDataInfo>
   <FormatInfo>
   (&(color=Binary)(image-file-structure=TIFF-limited)(dpi=400)
   (dpi-xyratio=1)(paper-size=A4)(image-coding=MMR)(MRC-
   mode=0)
   (ua-media=stationary) )
   </ FormatInfo>
</ OriginalDataInfo>
</ sampleattribute>
```
← INFORMATION

```xml
<g id="_x0083_x008C_x0083_C_x0083_x0084_x0081_x007C_x0020_1">
<path style="&st2;" d="M70.855,0.051v44.36H0.051V0.051h70.805z" />
<path style="&st8;" d="M52.938,0.051v4.263H38.422h-2.715h-0.33v0.319l-6.609,
       6.381H3.705V0.051H1.929v10.963H0.051v1.827h1.878v6.396v1.827h1.776h5.177
       v11.572H0.051v3.351h52.888v8.425h4.847V0.051h-4.847z M3.705,12.841h23.17
       h2.71516.939-6.699h16.409v21.013H37.495l-6.551-7.918h-2.715H3.705v-6.396
       z M10.709,21.063h29.7416.55,7.918h0.025h0.279v3.654H10.709V21.063z M38.4
       22,32.636v-3.654h0.583h13.933v3.654H38.422z" />
<path style="&st6;" d="M0.051,17.352v-1.662h51.162v1.662H0.051z" />
<path style="&st4;" d="M46.949,17.352v-1.662h4.264v1.662h-4.264z" />
</g style="&st4;">
       <path d="M37.561,17.352v-1.662h4.263v1.662h4.263,z" />
       <path d="M28.172,17.352v-1.662h4.263v1.662h4.263,z" />
       <path d="M18.783,17.352v-1.662h4.264v1.662h4.264,z" />
       <path d="M9.394,17.352v-1.662h4.264v1.662h9.394,z" />
</g>
<path style="&st6"; d="M0.055,17.352v-1.662h4.213v1.662H0.055z" />
<path style="&st4"; d="M70.855,11.979H50.604v6.953h-3.654v7.258h4.974v-5.126h18.932v-9.085z" />
<path style="fill-rule:nonzero;fll:#BCB1B9;" d="M45.782,18.932v7.258v-7.999v-7.258h7.999z" />
<path style="fill-rule:nonzero;fll:#BCB1B9;" d="M30.047,26.596v-4.822h-4.687v4.822h4.687z" />
```

TIFF DATA

```
49 49 2A 00 08 00 00 00 11 00 FE 00 04 00 01 00 00 00
02 00 00 00 00 00 01 04 00 01 00 00 00 10 09 00 00 01 01
04 00 01 00 00 00 EA 0C 00 00 02 01 03 00 01 00 00 00
01 00 00 00 03 01 03 00 01 00 00 00 04 00 00 00 06 01
90 5A 16 EC 90 0C 57 58 7A 90 60 43 87 88 CB 0E 11
57 28 AE D7 30 8C 8B E3 5A 1A 05 87 14 04 75 A8 21
E2 EA F0 F6 10 71 85 A0 10 F1 E3 96 D1 A1 B4 20 49
0A 22 7E AF 61 D7 C6 B5 87 88 CB 83 E4 2D A8 28 1C
C2 05 17 5A 3E A4 6B D0 0F 11 1F 76 95 24 59 4B 52
CA 7B 48 8A 0A 8D A5 56 48 DC 79 0F 41 50 68 BF 82
14 22 AE 2A C8 EF 16 71 D9 18 82 BA C9 A6 71 A1 7E
35 6E D8 64 23 51 48 41 C4 97 4A 38 A4 29 5C 90 B1
24 4D 36 55 15 6E 08 C2 21 B8 AE 35 B4 B5 A0 AD 0D
36 48 21 10
```

↓ base64

TEXT DATA

```
SUkqAAgAAAAAAQAP4ABaABaAAAAAgAAAABBaABAA
AAwAYAAAEBBAABAAAAYwQAAAIBAwABAAAAAQAA
AAMBAwABAAAACQAAAAYBAwABAAAAAAAoBA
wABAAAAAgAAABEBBAABAAAA4AAAABIBAwABAAAA
AAQAAABJBAwABAAAAAQAAABYBBAABAAAAYwQA
ABcBBAABAAAA1AEAABoBBQABAAAAzgAAABsBBQ
ABAAAA1gAAACgBAwABAAAAgAAACkBAwACAAAA
AAABAAAAAADMAAAAQAAAGIAAABAAAAAAAA
AAACAfwAAIEwD5MozOsknspyylHeSMH-aamoaObx8ROR
kM1mWsFeasbAKvwCMI1OrgRNtpMs6GAnyW+OEWpo6
NeiSsLxp5UsrlNC49CyMVuTJU6w190eQwe1JinHQ0BK7
2jDviOOVy+3q6bVD1MuwTomlwxNkhjFBzrf9hlZ2RlFXRo
ltp43Td8Wf8ArKGhH0JD+2gGvO5yFFnoYsRYFsECFoEb
OFoXzwVne4polTWWLtcztkxMhb7SIOtfP5L7NihMOpfr4J
PkE8kHGUqdmRzA6M/puuOXlW+Lx3kEhyuXJTmQUWtD
wKQuNGMMC7YODBMMNQgJu8CXvwXioNiXjyO7JzuAS]
bgsLlgdsEcwP8CpeY6Z6fNE20b6V1Ljc0Vz0KR2siq1Vn
wUAAARjwI=
```

GENERATED XML DOCUMENT

```
<?xml version="1.0?">
<image>
<image-format>TIFF</image format>
<image-encoding>Base64</image-encoding>
```

STRUCTURED KEYWORD etc.

```
<image data>
```

TRANSFORMED DATA

```
</image-data>
</image>
```

↑ INFORMATION FOR RESTORING

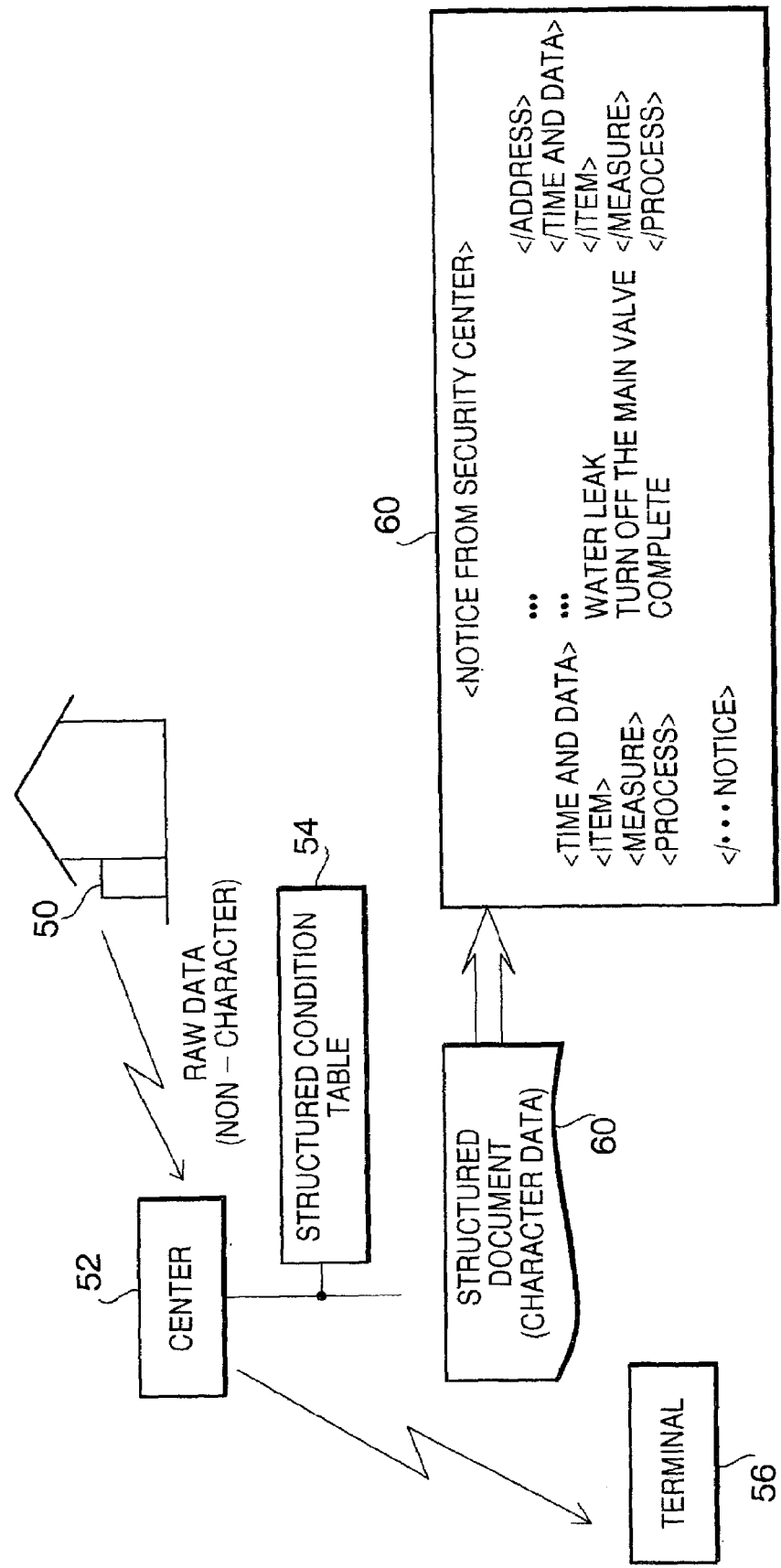

DEVICE AND PROGRAM FOR STRUCTURED DOCUMENT GENERATION DATA STRUCTURE OF STRUCTURAL DOCUMENT

CROSS REFERENCE TO RELATED APPLICATION

The present application claims priority of Japanese Patent Application No. 2001-168190, 2001-168191, & 2001-168192 filed Jun. 4, 2001 with Japanese Patent Office and the entire disclosure thereof is incorporated herein by reference.

BACKGROUND OF THE INVENTION

1. Field of the Invention

The present invention relates to a device and a program for structured data generation of structuring non-character data such as facsimile data, moving image data and voice data, as well as to a data structure generated by them. Moreover, it relates to a processor and a program for processing a structured document.

2. Description of the Related Art

There are proposed structured document standards such as XML (Extensible Markup Language), SVG (Scalable Vector Graphics), XHTML (Extensible Hypertext Markup Language) and VoiceXML (Voice Extensible Markup Language). Among these standards, XML is most popular. SVG is a standard that is extended XML literally applied to graphic vector data. XHTML is a standard that is redefined HTML by XML, and VoiceXML is a standard that is XML applied to voice data. In these standards, data is limited to character data for structuring by tag and so on, which an information processor can deal with through understanding its semantic content. XML, SVG, XHTML and Voice XML are markup languages for structuring data, and they are different from HTML (Hypertext Markup Language) for expressing data (with the designation of tab, linefeed, font and the like.).

The XML, SVG, XHTML and Voice XML are characteristically capable of defining an attribute name related to a structured data. The attribute is a set of the data name and the data itself, and the data can be interpreted and processed in terms of its name related to its meaning or semantic content. As far as the data processing convenience is concerned, a processable data is limited to character data, and the processable data especially in XLM is limited to non-numeric character data, that is text data.

SVG is a standard for the structured document, as well as SVG (Scalable Vector Graphics) can manipulate vector data. So if the raster format image data is transformed into the vector format image data, SVG can structure the vector format image data so as to easily reduce, expand, eliminate, add and modify the vector format graphic data. Accordingly, VoiceXML (Voice Extensible Markup Language) can manipulate voice data. However, these standards are exclusively aimed at structuring image data and voice data. Actually apart from SVG and VoiceXML, there are ongoing research topics on voice recognition and image recognition which are, for example, finding ways of understanding meanings of voice data and image data, extracting characteristics from voice data and image data, cutting off objects from image data, or extracting movements of objects or persons from moving image data, and so on.

Since, in these standards for structured document, the processable data is limited to text data, non-structured document such as still image data, moving image data or voice data is non-character data, which is not processable.

SUMMARY OF THE INVENTION

One advantage of the present invention is to make it possible to easily generate a structured document related to a received non-structured data. Another advantage of the present invention is to make it possible to forward data to a client address determined by an extracted information. Another advantage of the present invention is to make it possible to transform the extracted information into a flexible information to be structured. A further advantage of the present invention is to make it possible to transform a non-character data such as an image data into a structured document. Other advantages include, to make it possible to restore a structured document to its original non-character data; to make it possible to easily process a received structured document related to a non-character data such as an image data, a voice data, and the like; to make it possible to re-generate a transformed non-character data into a character data; to make it possible to properly process a non-character data; and to make it possible for users to easily set a process condition for a structured document.

A structured document generation device of the present invention includes means for receiving and transmitting a non-structured data, means for receiving and transmitting a structured document, and means for generating a structured document by using a communication's information of a received non-structured data and by relating it to a received non-structured data.

Preferably, the non-structured data is to be non-character data such as image data or voice data of bitmap data, raster data and the like. Besides, in this specification, "non-character data" is used in contrast to "character data" including character, numeric data, and control data, and "main data" means non-character data or data which is transformed into character data, such as image data, voice data and the like.

Preferably, the communication's information is to be extracted from a source address information, a receiving device information, and a channel information, and a transmitted information based on a communication protocol. Besides, the communication's information is a basic control data regarded as a character data. The source address information includes a source network address, a source facsimile number, a sub address and the like, and the receiving device information includes a device number in a plurality of receiving devices, and the like. The channel information includes a communication condition or whether it is good or not, a data volume, a time for communication, a communication time and the like. The transmitted information based on the communication protocol includes a transmitted data type such as a facsimile communication, a moving image data, a voice data and the like, an image resolution, a data compression and a coding rule, a selection of communication mode such as a communication number, a confidential communication, a polling communication, and the like, and a comment data such as a page number, a page break and the like. Since the distinction is ambiguous among the information based on the communication protocol, the source address information, the receiving device information, the channel information and the like, they are generically named the communication's information.

Preferably, a structured document generation device is to determine a client related to the generated structured document according to the extracted communication's information, and forwards the data to an address of the determined client More preferably, the transformation means is to make a part of the extracted information as it is an attribute of the structured document and to make the rest of the extracted information transformed into the other kind of information an attribute of the structured document.

A structured document generation program of the present invention, which includes both means for receiving and transmitting a non-structured data and means for receiving and transmitting a structured document and is to be read and run by an information processor, is characterized in that there are the steps of extracting a communication's information from a received non-structured data, and the steps of generating a document structured by making the extracted information its attribute and by relating to the non-structured data.

Besides, as far as the structured document generation program is concerned, the matters on device or procedure for structured document generation or the matters on the forwarding and processing after the generating are as they are applied to the generation program as well, except for the matters which are not applicable to the generation program.

Preferably, non-structured data is to be non-character data. Preferably, at the extracting steps mentioned above, the program is to extract the communication's information from a source address information, a receiving device information, a channel information, and a transmitted information based on the communication protocol. Preferably, the program is to include the steps of forwarding the data to the client address according to the extracted information related to the generated structured document. More preferably, at the extracting steps, a part of the extracted communication's information is to be an attribute of the structured document as it is and the rest of it transformed into the other kind of information is to be an attribute of the structured document.

The present invention generates a structured document related to a non-structured data by attaching a communication's information to its attribute. If the non-structured data is a non-character data, this relation is that the structured document is linked with an attached file of a non-character data or includes the non-character data transformed into a character data. The communication's information includes a source address information, a data type information, a communication time & date information, a data volume information such as a communication volume, a communication time and so on. Only by structuring them as attributes, the data type and its content can be considerably regulated, and it becomes easier to process, store and maintain the non-structured data.

Now, if a non-structured data is a non-character data, which is easy to control, it is especially convenient for processing, storing and maintaining the data. The communication's information includes a source address information, a receiving device information, and a channel information, and a transmitted information based on the communication protocol, which are naturally acquired on receiving data and can be easily attached to the attribute.

Moreover, the necessary data is supplied to the client who needs the data, by determining the client according to the communication's information and by forwarding the data to the address of the determined client.

It is easy to control the document when a part of the extracted communication's information is an attribute as it is and the rest of the extracted communication's information is transformed into the other data to be an attribute. For example, if the document type is presumed from the source address, the document type is more suitable for the attribute than the source address. Moreover, a part of the communication's information is transformed into the data to be an attribute and the remains not suitable for transformation is to be an attribute as it is, so the structured document can be controlled more easily.

The structured document's data structure of the present invention includes an attribute of the non-character data which is at least transformed into the text data and a text data which expresses the data transformation condition from the non-character data into the text data.

Moving image data, voice data and the like are used as non-character data, however, preferably still image data is to be used as non-character data. The still image data here means by the image data through facsimile communication or image scanner. As the still image data is relatively smaller in volume compared with the moving image data, the voice data or the like, the still image data is suitable to be transformed into the text data to be memorized. And as it is often the document data which is repeatedly used and highly necessary for reference, it should be transformed into the structured document to be capable of maintaining for its conveniences.

Moreover, the structured document generation device of the present invention includes means for transforming a non-character data into a text data, and means for generating a structured document with an attribute of at least the text data and a text data of transformation condition from the non-character data into the text data.

Also, the structured document generation program of the present invention includes the steps of transforming non-character data into text data, and the steps of generating a structured document with the attribute of the text data and a text data of transformation condition from the non-character data into the text data. Naturally, as this program is designed for the information processor which can read and run the program, it is used by means of recording mediums such as a CD-ROM or a hard disc in which the program is memorized, and it is in a propagation wave supplied to the information processor through the Internet and the like.

The structured document's data structure of the present invention includes the attributes of the non-character data such as still image data transformed into text data and the data for restoring the text data to its original non-character data. Thus, as the non-character data can be transformed into the structured document to be controlled and stored not in an attachment file but in the structured document itself, which is easy to manipulate. Moreover, as the transformation condition from non-character data into text data is included in its attribute, it is easy to be transformed into non-character data. Therefore, the non-character data becomes easy to manipulate.

If the non-character data to be transformed into a character data is a still image data, the data received by the facsimile or read by the image scanner can be transformed into the structured data to be easily maintained.

In the structured document generation device of the present invention, a non-character data is transformed into a text data to be an attribute of a structured document and a text data of transformation condition from the non-character data into the text data is attached to the attribute. As the non-character data can be easily transformed into the structured document, the non-character data exists not in the attachment file but in the file of structured document, and can be easily transformed into the original non-character data.

With the structured document generation program of the present invention, a non-character data is transformed into a text data to be an attribute of a structured document and the text of transformation condition from the non-character data into the data is attached to an attribute. As the non-character data can be easily transformed into the structured document, the non-character data exists not in the attachment file but in the file of structured document, and can be easily transformed into the original non-character data.

The structured document processor of the present invention processes the related non-character data, referring to the structured information in the received structured document which is related to the non-character data transformed into the character data or is linked to the non-character data.

In the present invention, non-character data means by voice data or image data, such as still image data, moving image data, and the like, which is used in contrast to character data including characters, numerical data, and control data.

Preferably, the structured document processor of the present invention is to include means for re-transforming the character data into the non-character data. Preferably, the processor is to include means for processing the related non-character data based on the structured information. More preferably, the processor is to include a table for determining the process condition according to the structured information and means for accepting an user's input to the table and memorizing the input in the table, so as to determine to process by referring to the table by the structured information.

The structured document process program of the present invention comprises the steps of extracting the structured information as an attribute of original non-character data from the structured document where the non-character data is the main data, and the steps of determining the process condition of structured data based on the extracted structured information.

Preferably, the structured document process program of the present invention is to comprise the steps of generating a table for determining the process for the non-character data by referring to the structured information, and the steps of accepting and memorizing the users' input in the table, so that the process of the non-character data is determined by referring to the table according to the extracted structured information.

In the present invention, the non-character data can be processed by referring to the structured information stored in the received structured document related to the non-character data. Then, by using the structured information, the non-character data can be properly processed.

In the present invention, even if the non-character data is transformed into the character data, which is included in the structured document, the character data can be re-transformed into its original non-character data, which can be re-generated to be printed or displayed by devices. Accordingly, in the present invention, the non-character data is easily processed to be put into the database with attached indexes, printed with the structured information and forwarded to the determined address and the like.

In the present invention, there is a table provided for determining the process according to the structured information and the users can freely input and memorize the process in the table, so that the proper process can be smoothly executed according to the user's choice.

BRIEF DESCRIPTION OF THE DRAWINGS

FIG. 5 is a diagram illustrating an example of structuring a facsimile data to a SVG document.

FIG. 6 is a diagram illustrating an example of structuring a facsimile data to a XML document.

FIG. 7 is a block diagram illustrating an example of the preferred embodiment of the present invention used for transferring a sensor signal.

DETAILED DESCRIPTION OF THE INVENTION

Figure 1:
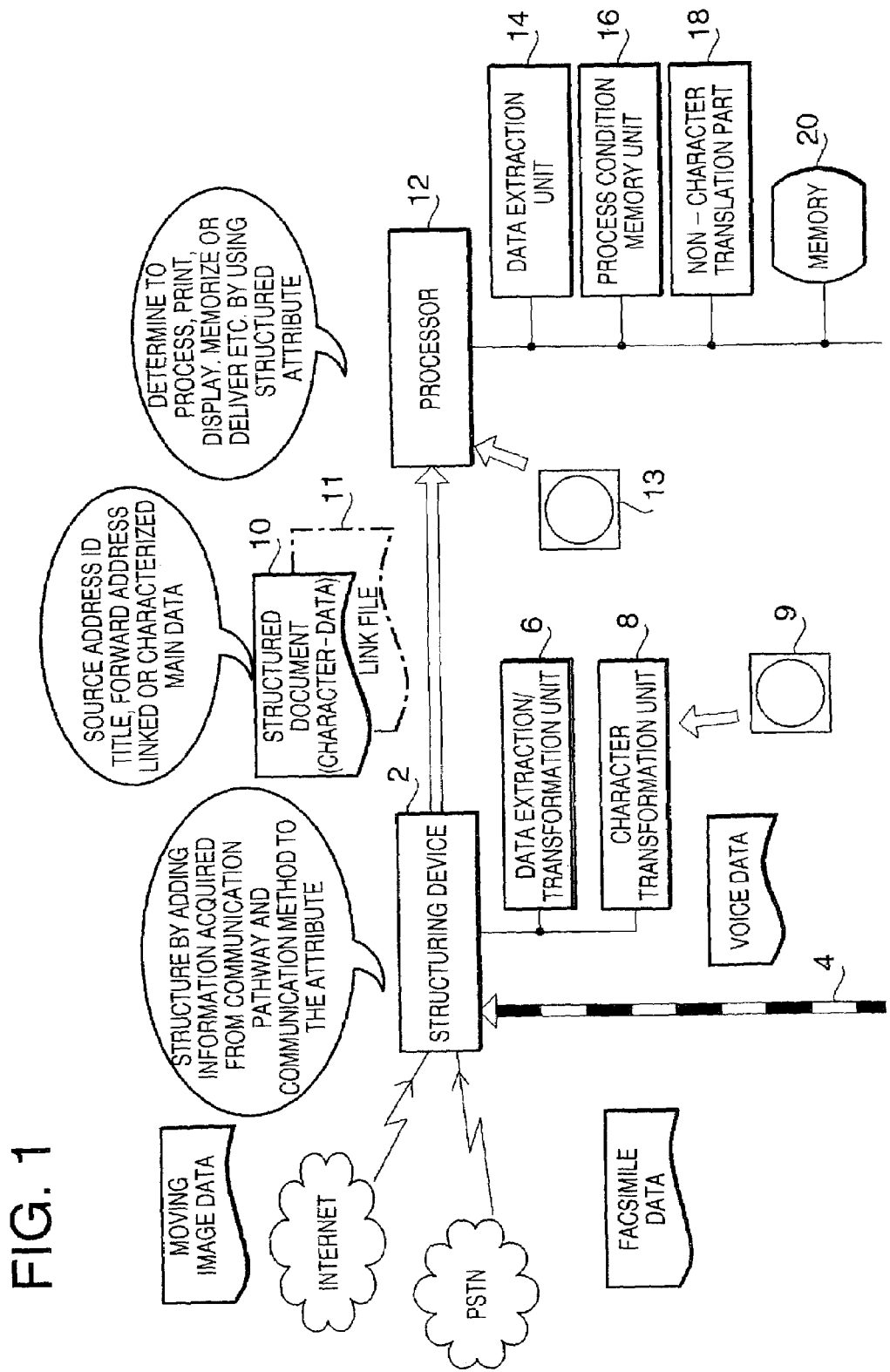
FIG. 1 is a block diagram illustrating operations to structure, transfer and process a non-character data in a preferred embodiment of the present invention.

FIG. 1–FIG. 7 illustrate the embodiments and variations of the present invention. FIG. 1 illustrates a basic embodiment of the present invention, where a structured document generation device 2 can receive or transmit a non-character data such as a voice data and an image data, and a structured document 10 related to these data. Moreover, the structured document generation device 2 reads a program from a proper recording medium and runs the program for generating the structured document. The structured document generation device 2 which is connected to a LAN 4 receives or transmits the non-character data and the structured document. Besides, the structured document generation device 2 which is connected to the public switched telephone network (PSTN) receives or transmits the facsimile data and the like. Further, the structured document generation device 2 connected to a network such as the Internet receives or transmits a facsimile data, a moving image data, a voice data and the like. Moreover, the structured document generation device 2 which is connected to an image scanner, a video camera and the like generates non-character data.

The structured document generation device 2 has a data extraction/transformation unit 6, which extracts a data used as an attribute of the structured document from the communication's information, transforms a part of the data into a more manageable data to be used as an attribute of the structured document, and transforms the rest of it as it is into the attribute of the structured document. A character transformation unit 8 transforms the received main non-character data through the communication into the character data, however the character transformation unit 8 is not necessarily provided. The structured document generation device 2 reads a structured document generation program, memorized in a recording medium 9 such as DVD and CD-ROM, and allocates resources of the device 2 to the data extraction/transformation unit 6 along with the reading, so as to generate the structured document 10. And the structured document generation device 2 forwards the structured document 10 to the predetermined address of a structured document processor 12 and the like together with an attachment file (link file) 11 of the non-character data through the LAN 4 and the like. Moreover, if a non-character data is transformed into a character data, it is transmitted by including the character data in the structured document. Besides, FIG. 1 illustrates that the structured document 10 does not pass through the LAN 4, for convenience of the drawings.

The communication's information comprises a source data of address and ID, a data type such as a facsimile image, a moving image and a voice data, a communication mode, a communication pathway to the receipt in case of the Internet, a receiving device number, a receiving time and date, a communication time, a data volume, a communication result and the like. They are parameter information, source address information, and receiving device information, which is necessary for the communication or along with the communication. The selected proper information among them is to be structured, or the selected information is transformed into another keyword to be structured. Moreover, if an e-mail type data is received, an attachment file embraces a non-character data, and a header or a text embraces a communication's information as well as a title, a forward address information such as "pass along", "distribution", and "only project member", and a confidential level such as "confidential", "for internal use only", and the like, which can be referred in processing the, non-character data. Consequently, the structured document is generated with the data acquired from the header or the text to be the structured information.

Moreover, if the structured document generation device is used as a source of non-character data such as an image scanner and the like, it is expected that, in reading data, a user input a keyword, a forward address, a handling, a title and the like which are to be a structured information. The character transformation unit 8, which transforms a non-character data into a character data in particular, is not necessarily provided, and the structured document file 10 linking with the attachment file 11 of non-character data is transferred to the determined address of the structured document processor 12 and the like through the LAN 4 and the like.

The structured document processor 12 processes, prints, displays, memorizes and forwards the structured document by using its attribute, and reads the process program for the structured document by a recording medium 13 of DVD or CD-ROM and the like A data extraction unit 14 extracts an attribute to the structured communication's information, and a process condition memory unit 16 determines to process, print, display, memory, or forward, in searching the used process conditions by using the extracted data, and determines the process of the transferred structured document. A non-character transformation unit 18 is not necessarily provided for re-transforming a character-transformed data in the structured document into a non-character data. A memory unit 20 memorizes the structured document, the process conditions, the main attribute and the like.

Figure 2:
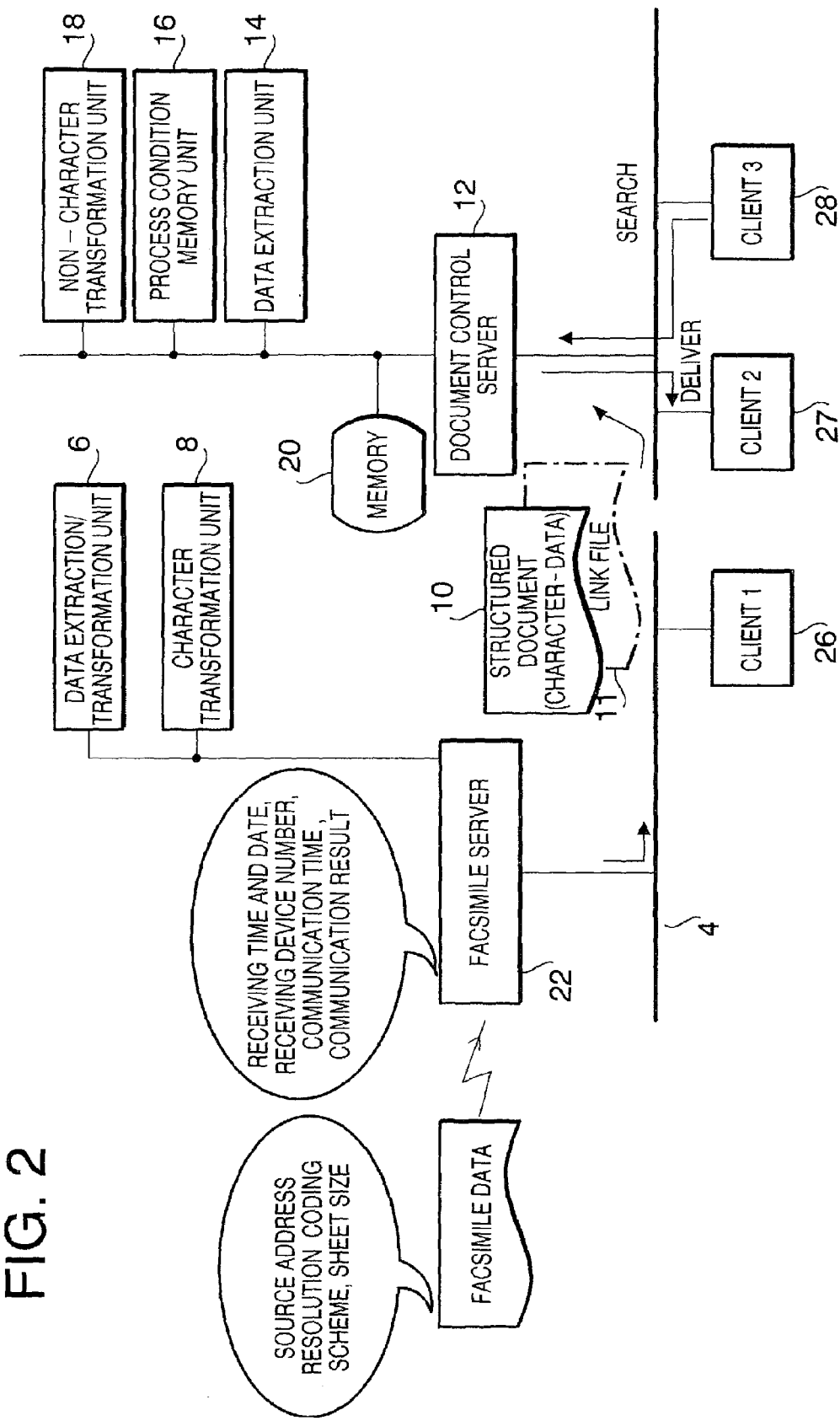
FIG. 2 is a block diagram illustrating an example applied to the preferred embodiment of the present invention of FIG. 1 in processing a facsimile data.

FIG. 2 illustrates an example of the embodiment of FIG. 1 that actually describes the relation between a facsimile server 22 and a document control server 24. The facsimile server 22 is connected to the document control server 24 through the LAN 4, and the facsimile data is transmitted to the facsimile server 22 through the Internet, the public switched telephone network and the like. The facsimile data is an image data as a main data, and a communication's information such as a source address, a resolution, a coding scheme, a sheet size, the number of data sheets, and special transmission modes such as a confidential transmission, a polling transmission and the like. The facsimile server 22 receives a facsimile data, and generates a receiving device information such as a receiving time and date, a device number or numbers of a plurality of the receiving devices, a communication time and a communication result. So, what the facsimile server 22 receives and what the facsimile server 22 can generate are the communication's information. The data extraction/transformation unit 6 extracts data from the communication's information, and transforms a part of them into a document title such as a design document and an accounting document, related clients names and a handling condition such as pass along, distribution, confidential level 2 and the like. Moreover, as described above, the character transformation unit 8 transforms an image data of a main facsimile data into a character data. Accordingly, to attach the data made by the data extraction/transformation unit 6 to the image data transformed into the character data by the character transformation unit 8 is to generate the structured document 10.

Moreover, if the facsimile server 22 receives a facsimile data in the e-mail format, the structured data extraction/transformation unit 6 extracts keywords such as a title, a forward client name, pass along, distribution and confidential level 2 from the header and the text, and attaches them to the structured information. Further, if necessary, the character transformation unit 8 transforms the non-character data into the character data to be included in the structured document, or the file of non-character data is attached and linked to a structured document. Besides, if non-character data is transformed into character data, the data for retransformation is attached to the structured information.

The structured document 10 is transferred to the document control server 24, where the data extraction unit 14 extracts the process condition, the keyword for searching classification, from the part of the structured communication's information, and the process condition memory unit 16 determines the corresponding process condition by referring to the data. Then, the memory unit 20 memorizes the process condition, which is to forward the structured document 10 to the determined clients 26–28, to print and display the structured document by devices, and so on.

In order to print or display the structured document or the structured information, the structured document is re-transformed into a non-character data, or the structured information is combined with a non-character data for users' convenience. In this combination, for example, the structured information is sometimes printed in the margin of the printout or display, the front page and the like of a non-character data. The each type of processes is, for example, to combine the structured information with a non-character data, to generate the front page for a summary, to input to the database, and the like.

Figure 3A:
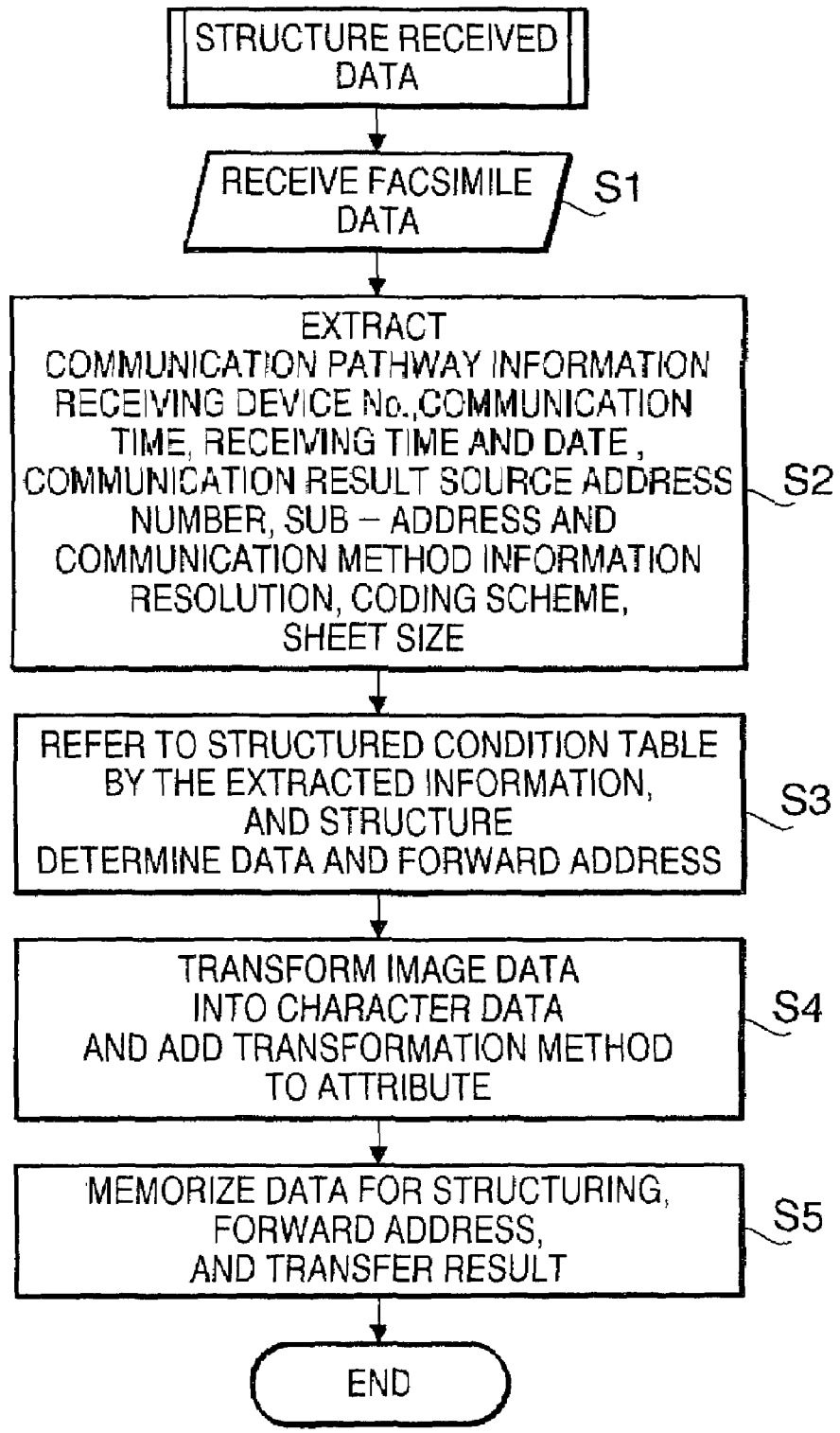
FIG. 3a is a flow chart illustrating a structured program of a facsimile data.

FIG. 3a illustrates as an example algorithm of structuring a received data in case of FIG. 2. At Step 1, the facsimile data is received, and at Step 2, the communication pathway information including a receiving device information and a communication method information are extracted from the received information. Precisely, the communication pathway information includes a receiving device number, a communication time, a receiving time, a communication outcome, a source address number, a sub address number and the like. Moreover, the communication method information includes a resolution of the facsimile data, a coding scheme, a sheet size and the like. Next, at Step 3, by referring to the structured condition table memorized in the process condition memory unit, the extracted information is categorized into the information used as an attribute as it is, the information to be transformed into an attribute, and a discarded part, and the proper tag is attached to the structured part, then the forward address of the structured document is determined. Next, at Step 4, for example, the image data is transformed into the character data and the used transformation format is attached to the attribute. At step 5, if this process is not executed, the image data is to be the attachment file to the structured document, and the structured document and the attachment file are transferred to the forward address, and the data used in structuring, the forward address and the forward result are memorized.

Figure 4:
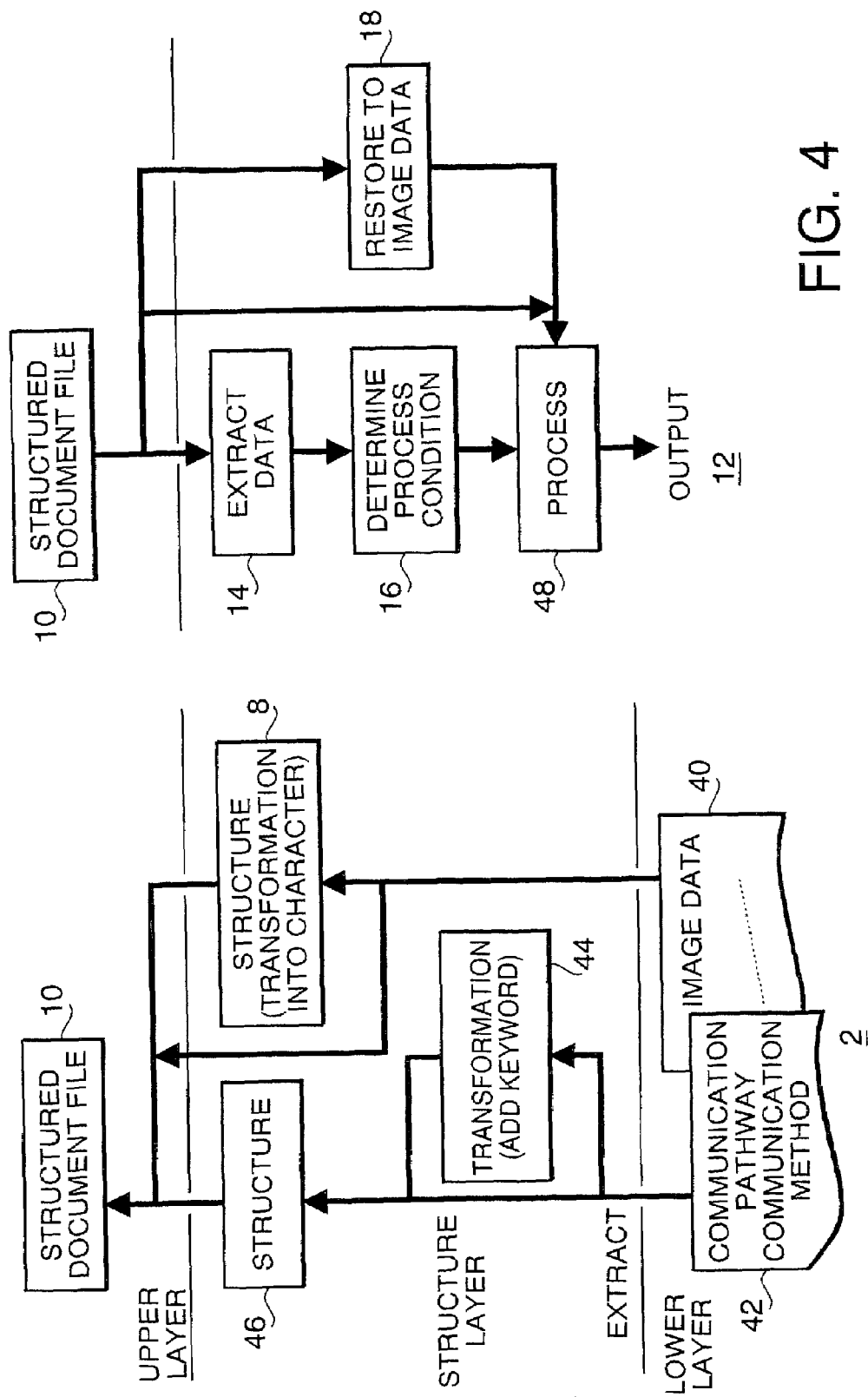
FIG. 4 is a diagram illustrating a model of structuring a facsimile data and processing the data in a forward address.

FIG. 4 illustrates a pattern diagram of the simplified relation between the structured document generation device 2 and the structured document processor 12 of FIG. 1. The structured document generation device 2 receives an image data 40 and an communication's information 42 which is related to a communication pathway and a communication method, and extracts some data from the communication's information. A data transformation unit 44 transforms a part of the extracted data into the keyword and the like, and a structure unit 46 attaches a tag and the like to the data to be structured. Additionally, the structure unit 46 attaches a tag and the like to the transforming format to be structured when the character/text transformation unit 8 transforms the still image data into the text data. Moreover, and the structure unit 46 attaches the tag and the like to the still image data transformed into the text data to be structured. The structured document file 10 is combined with all of them mentioned above.

Since the structured document file 10 is transferred to the structured document processor 12, where the data extraction unit 14 determines the process condition for the document or extracts the keyword for the storage, the search and the like from the document, and the process condition memory unit 16 determines the process condition based on the extracted data. After that, a processing unit 48 executes the determined process so as to output the non-character data or the character data. The various type of process conditions are to memorize the data in the memory unit 20 under the predetermined condition, to transfer the data to the predetermined client, to generate data base by using the communication's information, to generate summary page at the top page of the data in restoring the data to the image data, and the like, or to display the combined data of the extracted keywords, the image data, and the like.

Figure 3B:
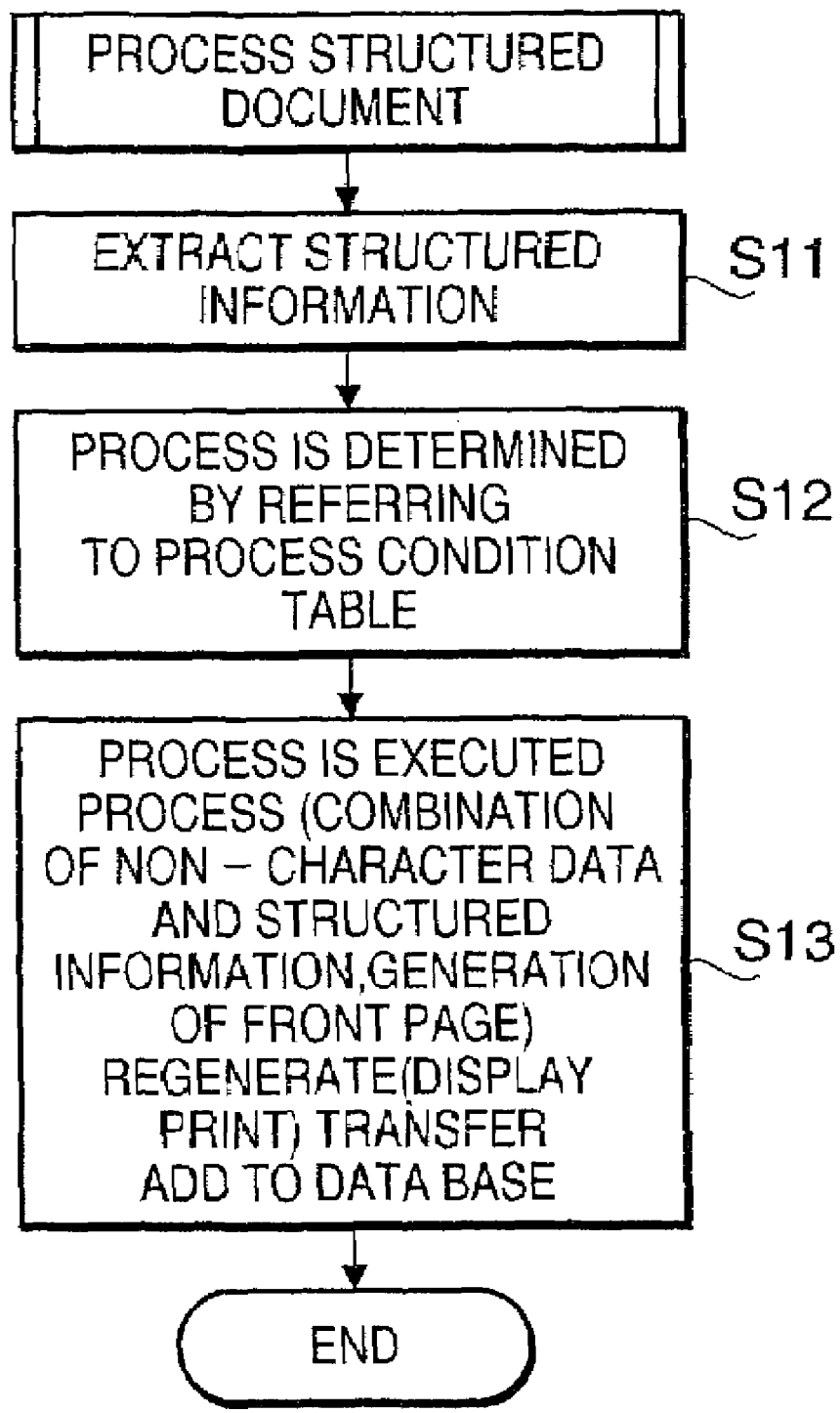
FIG. 3b is a flow chart illustrating a process program of a structured document in the preferred embodiment of the present invention.

FIG. 3*b* illustrates the process program for the structured document in the structured document processor 12. At Step 11, the structured document is transferred to the structured document processor 12, and the structured data extraction unit 14 extracts the structured information. At Step 12, the process condition memory unit 16, for example, refers to its process condition table by using the structured information and determines the process condition. At Step 13, the determined process is executed.

The process program for structured document is to re-generate non-character data, to generate a summary of non-character data for example, the front page is to be allocated for a summary data), to put into the data base by using the structured information and the like, to combine a non-character data with a structured information, to memorize a non-character data, or to transfer a non-character data, and a couple of processes combined may be executed. In order to re-generate, or to print and to display the data, the character-transformed data is re-transformed into non-character data to be re-generated. The additional process program of the structured document is to order to generate the additional process condition table and to memorize in the table that the users input the process condition for the structured information to the table.

FIG. 5 illustrates an example that the facsimile data is transformed into the structured document in the SVG standard. The communication's information is structured with the tags generated by itself and recorded in a space for the document attribute. Here, the recorded communication's information are, for example, a document number received as a title, a facsimile communication method, a receiving device address, a receiving time and date, a communication result, a page number, a communication time, a facsimile number of receiving device, and a facsimile number of source address. The additional recorded communication's information is that the original image data is a binary data received in TIFF format (the image file format with tag proposed by Adobe Systems Inc.), the resolution is 400 dpi same as to the scanning and sub-scanning directions, an A-4 sheet is used and the coding to the image data is implemented in MMR.

The vectorized data of the image data is recorded in the lower space of the document attribute. As illustrated in FIG. 5, a document control device can determine to process, to memorize, or to forward the document by using the attribute of the document and so on, and the data can be easy to manipulate as the image data is memorized as the solid character data in the structured document.

FIG. 6 illustrates an example that the TIFF data is structured in the XML standard. The left side of the upper part of FIG. 6 illustrates TIFF data which is transformed into text data by using BASE 64 as the text transformation format of still image data. The text transformation format of still image data also includes BinHex, Uuencode and the like. The recorded data is that the original data is in TIFF format, the TIFF data is transformed into the text data by BASE 64, the information acquired form the communication are attributed as keywords, and the still image data transforming into the text data by BASE 64.

The embodiment of the present invention has following advantages expected. In its embodiment, the keywords extracted from the communication's information as well as the information transformed into keywords can generate the structured document related to the non-character data. As these keywords are automatically generated, the meaning of these non-character data are not necessarily interpreted and their characteristics are not necessarily extracted. When the keyword is extracted from the communication's information or the information is transformed into keywords, the meaning and content of the data can be specified to some degree from the source address, the communication time and the data type and the like. Precisely, when a simple rule that a received facsimile data from a source address is a drawing with a specification is freely put into the extraction/transformation unit, the document content itself can be considerably specified.

Moreover, the data such as facsimile data, moving image data or voice data, which is originally not so suitable for the structured document can be transformed into a structured document in the embodiment of the present invention. As the keywords for processing and controlling the structured document can be extracted from the communication's information, or the information can be transformed into the keywords, these keywords are generated automatically. Therefore, the structured document can be controlled without interpreting the meanings of the non-character data or extracting the characteristics of the non-character data. In the structured document, as the non-character data is transformed into the text data to be a part of the structured document, which is easier to control on the contrary to the case of making another attached file. When the communication's information is transformed into a keyword or a keyword is extracted from the information, the meaning and content of the data can be sufficiently specified from the source address, the communication time, the data type and the like. Besides, if the simple rule that the data facsimiled from a source address is a drawing and a specification is freely put into the extraction and transformation unit, the document content itself can be considerably specified. Moreover, the content of the structured document can be specified by referring to its date, condition, number of pages, user's name, and file title which are made to be its attributes when the document or image data is scanned. As the structured document records the transformation condition from text data to non-character data, the text data can be restored to its original non-character data if necessary.

Further, in the embodiment of the present invention, facsimile data, moving image data, voice data, and the like can be processed by using structured information. The process condition for the structured information can be freely set on a table by users.

FIG. 7 illustrates an example that the embodiment of the present invention is applied to the data transfer of the home security system. For example, the respective houses are controlled by a home security system 50, which checks each lock of doors and windows, states of fire, gas, water, power, and the like by means of multiple sensors for transmitting the data input to a center 52 through PHS network (mobile phone network) and the like as raw non-character data. A structured document 60 is generated by using a structuring condition table 54 from the content of the source address and the transferred data in the center 52. For example, in the structured document 60, the title is "the notice from the security center", and attributes are the address, the date, and the item "water leak", as well as "turn off the main valve" and the process result "complete" which are executed by the home security system 50 to the notice of "water leak", and they are transmitted to a mobile phone or a terminal 56 of the personal computer and the like in the workplace.

For the Users having the terminals 56, it is not preferable to receive phone calls from the center 52 except for special situations like a fire, and the like. However, it is not preferable for the center not to notify the user at all the situation that a window is open or a simple water leak is fixed and the like in the user's house. Thus, in this embodiment, users can easily check anytime the structured document 60 notifies the result that such a miner problem is solved when they have time.

What is claimed is:

1. A structured document generation device comprising:
   means for receiving and transmitting non-structured image data,
   means for receiving and transmitting a structured document, and
   means for generating the structured document from the received non-structured image data by using a communication's information of the non-structured image data and by relating the communication's information to the received non-structured image data,
   wherein the communication's information is extracted from a source address information, a receiving device information, a communication pathway information, and a transmitted information based on a communication protocol, and
   wherein a part of the extracted communication's information is to be an attribute of the structured document as it is, and the rest of it is transformed into another kind of information by the generation means to be the attribute of the structured document.

2. The structured document generation device as defined in claim 1, wherein the non-structured image data is non-character facsimile data.

3. The structured document generation device as defined in claim 1, wherein a client, related to the generated structured document, is determined according to the extracted information and is transferred to a predetermined forward address.

4. A structured document generation program stored on a computer readable medium for an information processor, which can read and execute the program, comprising:
   means for receiving and transmitting non-structured image data, and
   means for receiving and transmitting a structured document, wherein the structured document generation program further includes
   extracting a communication's information from the received non-structured image data, and
   generating a structured document by making the extracted information as an attribute and by relating the extracted information to the non-structured image data,
   wherein at the extracting step a part of the extracted communication's information is to be an attribute of the structured document as it is and the rest of it is transformed into another kind of information to be the attribute of the structured document.

5. The structured document generation program as defined in claim 4, wherein the non-structured image data is non-character facsimile data.

6. The structured document generation program as defined in claim 4, wherein at the extracting step the communication's information is extracted from a source address information, a receiving device information, a communication pathway information, and a transmitted information based on a communication protocol.

7. The structured document generation program as defined in claim 6, wherein a client, related to the generated structured document, is determined from the extracted information and a step of forwarding the generated structured document to a predetermined address is provided.

8. A structured document generation device comprising:
   a transceiver for receiving and transmitting non-structured image data;
   a transceiver for receiving and transmitting a structured document; and
   a transformation unit for generating the structured document from the received non-structured image data by using a communication's information for the non-structured image data and by relating the communication's information to the received non-structured image data,
   wherein the communication's information is extracted from a source address information, a receiving device information, a communication pathway information, and a transmitted information based on a communication protocol, and
   wherein a part of the extracted communication's information is to be an attribute of the structured document as it is, and the rest of it is transformed into another kind of information by the transformation unit to be the attribute of the structured document.

9. The structured document generation device as defined in claim 8, wherein the non-structured image data is non-character facsimile data.

10. The structured document generation device as defined in claim 8, wherein a client, related to the generated structured document, is determined according to the extracted information and is transferred to a predetermined forward address.

* * * * *